United States Patent
Yariv et al.

[11] 3,860,880
[45] Jan. 14, 1975

[54] TRAVELLING WAVE OPTICAL AMPLIFIER AND OSCILLATOR

[75] Inventors: Amnon Yariv; Desmond R. Armstrong, both of Pasadena, Calif.

[73] Assignee: California Institute of Technology, Pasadena, Calif.

[22] Filed: May 18, 1973

[21] Appl. No.: 361,403

[52] U.S. Cl.............................. 330/5, 330/43, 331/82, 315/3.5, 315/4
[51] Int. Cl............................................ H03f 3/58
[58] Field of Search................ 315/4, 39; 330/5, 43; 331/82

[56] References Cited
UNITED STATES PATENTS
2,866,917  12/1958  Salisbury................................ 315/4
2,939,998  6/1960  Salisbury................................ 315/4

Primary Examiner—John Kominski
Assistant Examiner—Darwin R. Hostetter
Attorney, Agent, or Firm—Lindenberg, Freilich, Wasserman, Rosen & Fernandez

[57] ABSTRACT

A tunable travelling wave optical device consists of a dielectric optical waveguide with a top surface, which is periodically corrugated with a corrugation periodicity, L. At least the corrugated top surface is in an evacuated envelope wherein an electron beam with an adjustable electron velocity, $v_e$ is formed. The electron beam propagates in close proximity to and in a direction parallel to the direction of propagation of an optical beam through the guide. The electron velocity is adjusted to be greater than but on the order of the phase velocity of the first spatial harmonic generated in the corrugated waveguide. The wavelength $\lambda$ of the optical beam which is amplifiable by the device, or is produced therein when the latter acts as an oscillator, is substantially equal to $c/v_e$ L, $c$ being the speed of light.

6 Claims, 5 Drawing Figures

TRAVELLING WAVE OPTICAL AMPLIFIER AND OSCILLATOR

BACKGROUND OF THE INVENTION

1. Field of the Invention

The present invention relates to amplifiers and oscillators and, more particularly, to travelling wave optical amplifiers and oscillators.

2. Description of the Prior Art

In recent years, considerable attention has been directed to dielectric thin films as waveguides for electromagnetic wave energy. It is believed that the incorporation of a dielectric thin film waveguide to provide oscillation or amplification of energy, i.e., signals, in the optical region, particularly, the infrared region, would represent a significant advance in the art. At present, such amplifiers or oscillators are neither available nor described in the literature.

OBJECTS AND SUMMARY OF THE INVENTION

It is a primary object of the present invention to provide a travelling wave amplifier employing a dielectric thin film.

Another object of the present invention is to provide a novel travelling wave optical amplifier or oscillator.

Another object of the invention is to provide a novel travelling wave amplifier which incorporates a dielectric thin film waveguide and which is particularly adapted to amplify or produce an optical beam in the infrared optical region.

These and other objects of the invention are achieved in an amplifier or oscillator in which an interaction takes place between an electron beam and the optical field in a periodically perturbed dielectric thin film waveguide. When the electron velocity is nearly equal to that of one of the spatial harmonics of the field, a coherent exchange of energy takes place. The thin film waveguide is periodically perturbed by corrugating its top surface with a corrugation periodicity L. L is chosen so that the phase velocity of the selected spatial harmonic is nearly equal to the electron velocity of the electron beam which is directed parallel to the corrugated surface and as close as possible thereto. At least the beam and the corrugated surface are in an evacuated envelope so as to maximize the electron velocity and avoid collisions with air molecules. With an electron velocity of about one-tenth the speed of light, $c$, and a corrugation periodicity of about 1 micron ($\mu$), the present invention is capable of amplifying or producing an optical beam with a wavelength in the $10\nu$ range.

The novel features of the invention are set forth with particularity in the appended claims. The invention will best be understood from the following description when read in conjunction with the accompanying drawings.

DESCRIPTION OF THE PREFERRED EMBODIMENTS

Figure 1:
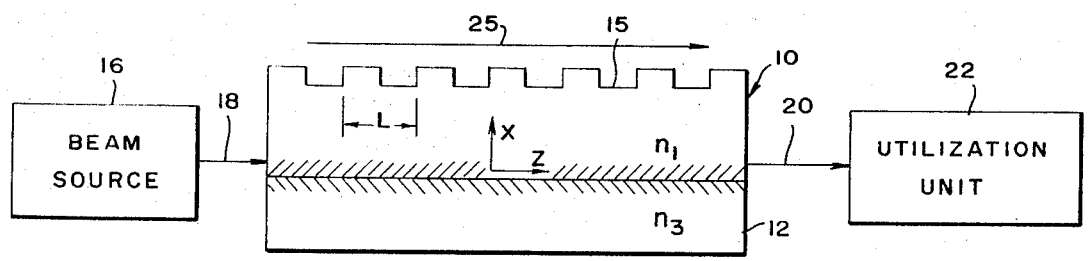
FIG. 1 is a simplified diagram of one embodiment of the invention, operating as a forward travelling optical amplifier.

Attention is first directed to FIG. 1, which is a simple diagram useful in explaining an embodiment of a forward travelling optical amplifier in accordance with the present invention. Therein, numeral 10 designates a dielectric thin film optical waveguide which is supported on a dielectric substrate 12. The index of refraction of guide 10, designated as $n_1$ is greater than $n_3$ which is the index of refraction of the substrate. As is appreciated, the substrate which, like waveguide 10, exhibits a low loss at the frequencies of interest, is chosen to confine the beam propagation to be in the waveguide 10.

The top surface 15 of the guide 10 is shown periodically perturbed by being corrugated with a periodicity L in the direction of wave energy propagation designated $z$. Techniques are known at present which enable the formation of such periodic corrugation down to 0.1 micron. In FIG. 1, numeral 16 designates a source of an optical beam 18 which is directed to guide 10, while the amplified optical beam is designated by numeral 20 and shown directed to a utilization unit 22.

At least the top surface 15 of the guide 10 is assumed to be in a vacuum, wherein an electron beam 25 moves in the $z$ direction in close proximity to the corrugated top surface 15. Due to the corrugated surface 16, the optical beam 18, which is directed to the optical guide 10 in the $z$ direction propagates through the guide in a form of an infinite number of spatial haromonics.

The propagation constant of any spatial harmonic, say the mth, is expressable as $$\beta_m = |\beta_o| + m\, 2\pi/L, \quad m = \pm 1, \pm 2, \pm 3, \ldots$$

where $m$ is the spatial harmonic number, and $\beta_o$ is the propagation constant of the fundamental spatial harmonic. The phase velocity of any of the spatial harmonics is expressable as $$v_{(ph)m} = \omega_o/\beta_m,$$

where $\omega_o$ is the angular frequency of the optical beam 18.

As is known from the theory of operation of microwave travelling wave tube amplifiers, an exchange of energy between an electromagnetic field and a beam of electrons takes place resulting in wave (signal) amplification whenever the phase velocity of one of the spatial harmonics of the field is slowed down by a slow wave structure so that the electron velocity is greater than the phase velocity of the spatial harmonics. This theory is amply described in "Travelling Wave Tubes" by J. R. Pierce, published in 1950.

The operation of the novel forward travelling amplifier of the present invention is based on this theory. In the present invention L is chosen so that the phase velocity of a selected one of the spatial harmonics is less than the electron velocity of the electron beam 25. Defining the electron velocity as $v_e$, in accordance with the present invention, L is chosen so that $v_e > v_{(ph)m}$. Consequently, the optical beam 18, as it propagates through the optical guide 10, is amplified and the amplified optical beam 20 is produced.

Figure 2:
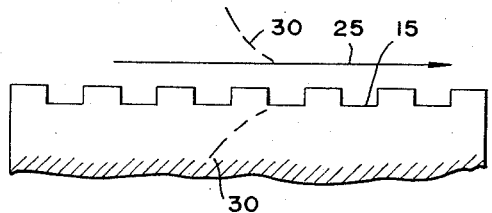
FIG. 2 is a simple diagram of the amplitude of the spatial first harmonic with respect to the corrugated waveguide, shown in FIG. 1.

It has been discovered that the amplitude of the first spatial harmonic ($m = \pm 1$) is greatest near the corrugated surface and that it decays exponentially therefrom. This is represented in FIG. 2 by dashed lines 30. Based on this discovery, it becomes apparent that by directing the electron beam 25 at close proximity to the corrugated surface 15, maximum interaction between the beam and the field is achieved, resulting in maximum energy conversion efficiency, when the phase velocity of the spatial first harmonic is less than the electron velocity $v_e$. That is maximum interaction is achieved when $v_e > \omega_0/2\pi/L + |\beta_0|$, i.e., when $v_e$ is essentially equal to, or very slightly larger than the phase velocity of the spatial first harmonic, hereafter designated as $v_1$. For explanatory purposes, one can assume that interaction takes place when $v_e \approx v_1$.

Since the present invention is directed to amplifying an optical beam, as will be apparent from the following, L has to be in the micron range. Thus, $2\pi/L >> \beta_0$ and therefore the above expression can be rewritten as $$v_e \approx \omega_0/2\pi\, L = c/\lambda\, L$$

where $\lambda$ is the wavelength of the optical beam and $c$ is the speed of light. Thus, $v_e \cdot \lambda/cL \approx 1$.

As previously pointed out, the electron beam 25 is produced in an evacuated envelope. Thus, a practical expected electron velocity is of the order of $1/10c$. Substituting this value for $v_e$ in the above expression $$1/10\, c \cdot \lambda/cL \approx 1.$$

Thus, $\lambda \approx 10L$.

It is thus seen that the upper limit of the amplifiable optical wavelength depends on $L$. As previously pointed out, with presently known techniques, a corrugation periodicity $L = 1$ micron, i.e., $1 \times 10^{-6}$ meters or less is attainable. Thus, with the present invention, an optical beam with a wavelength on the order of $10^{-5}$ meters, which is in the infrared band of the optical region, can be amplified.

In any constructed device $L$ is fixed. Thus, in the expression $$v_e \cdot \lambda/cL \approx 1,$$

only $v_e$ and $\lambda$ are variables. It should thus be apparent that if $\lambda$ changes, the equality can be satisfied by varying $v_e$. Thus, the novel amplifier of the present invention is tunable by adjusting $v_e$ whenever $\lambda$ changes. In general, the amplifiable wavelength may be expressed as $$\lambda = (c/v_e)\, L.$$

Figure 3:
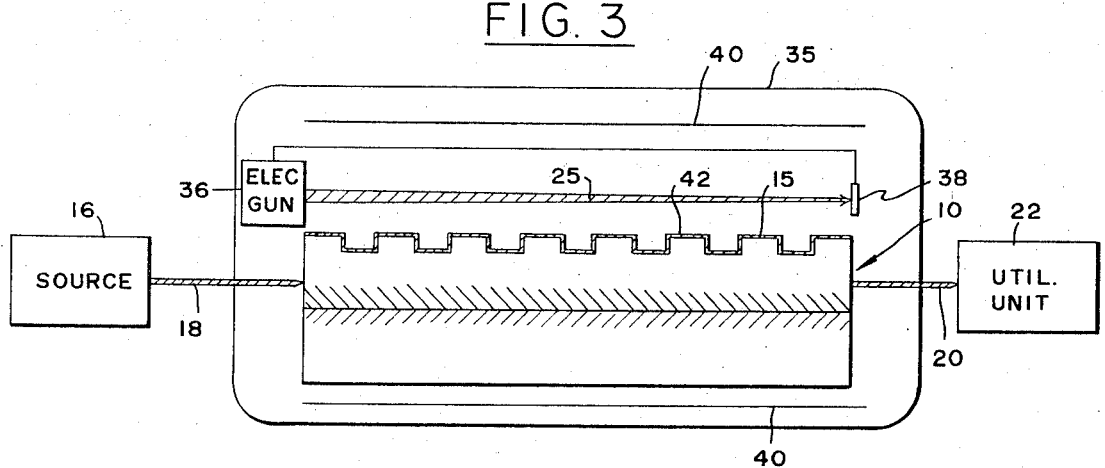
FIG. 3 is a more detailed diagram of the embodiment shown in FIG. 1.

Attention is now directed to FIG. 3 wherein numeral 35 designates an evacuated envelope. Therein, an electron gun 36 is shown located. The gun provides the electron beam 25 which is directed to an anode 38 which forms part of the gun. The electron velocity of the beam is assumed to be adjustable by controlling the electron beam producing voltage in gun 36. Also located in the envelope 35 is the optical guide 10 with the beam 25 in close proximity to the corrugated surface 15. In practice, the distance between the beam 25 and the corrugated surface should be less than the wavelength $\lambda$.

The electron beam should be confined to be near the corrugated surface and prevented from spreading. This may be achieved by providing a focusing magnetic field, as is appreciated by those familiar with the art. To simplify FIG. 3, the magnetic structure, providing such a field, is represented by lines 40. Thus, the electron beam and the guide are situated in the magnetic field region between lines 40.

Since the electron beam 25 is very close to the corrugated surface 15, typically at a fraction of a wavelength, some electrons may and probably will strike the surface 15, thereby building up a negative charge on surface 15. Such a charge well tend to repel the electron beam from the surface which is undesirable. Thus, to minimize the effect of striking electrons, the top surface 15 is preferably coated with a layer 42 of a transparent electrically conductive material, such as tin oxide. The layer, which is transparent to light, is connected to an appropriate potential, e.g., ground, in order to drain the striking electrons away from the surface and thereby prevent the negative charge, which would otherwise repel the electron beam, from building up.

In FIG. 3, the input optical beam 18 is shown entering the envelope 35 from the left while the output optical beam 20 exits from the right. That is, the optical beam in the guide 10 and the electron beam 25 propagate in the same direction. In such an embodiment, the amplifier acts as a forward travelling optical amplifier. If desired, it can be operated as a backward travelling optical amplifier by reversing the direction of propagation of the electron beam 25 with respect to the direction of propagation of the optical beam in the guide 10, and by a small adjustment of the electron velocity to obtain synchronism with a negative space harmonic.

A detailed analysis of the interaction of the electron beam with the optical field of the periodically perturbed (corrugated) dielectric thin film waveguide has revealed that in addition to amplifying an input optical beam, the present invention also operates as an optical oscillator, thus providing an output optical beam without requiring an input optical beam. By varying the electron velocity of the electron beam such as by changing the gun voltage, the invention acts as a voltage tunable optical oscillator.

Figure 4:
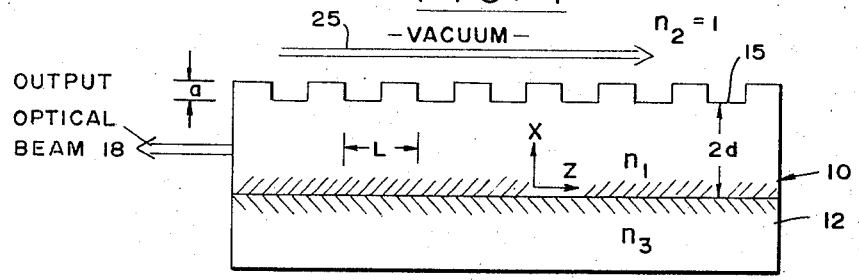
FIGS. 4 and 5 are diagrams useful in explaining an optical oscillator in accordance with the present invention.

The following is an analysis of the oscillator arrangement shown in FIG. 4 wherein elements similar to those previously discussed are designated by like numerals. As seen from FIG. 4 in the oscillator arrangement, the output optical beam 18 propagates in the $-z$ direction, which is opposite to the direction of propagation of the electron beam 25. Both the guide 10 and the substrate 12 are dielectrics with indices of refraction $n_1$ and $n_3$.

For a confined mode optical propagation it is necessary that $n_1 > n_3$. The electric field of a TM mode is given by a sum of spatial harmonics $$E_z(x, z, t) = \sum_{m=-\infty}^{\infty} E_m(x) e^{i(\omega_0 t - \beta_m z)} \quad (1)$$

with $$\beta_m = |\beta_0| + m\, 2\pi/L,\ m = \pm 1, \pm 2, \ldots \quad (2)$$

Figure 5:
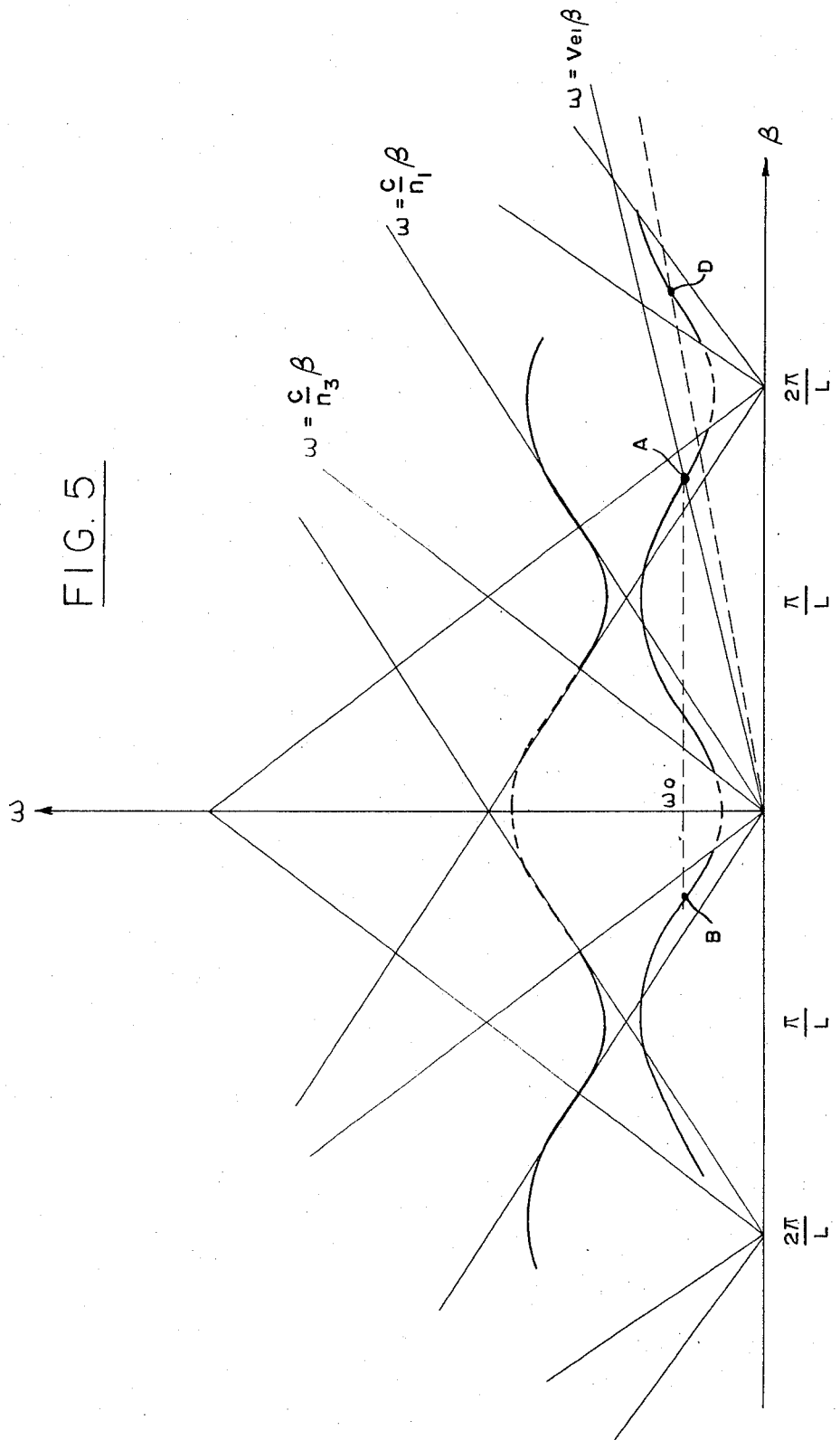

It follows from (2) that the dispersion characteristics need only be known for $0 < \beta_0(\Omega) < \pi/L$ in order to obtain the dispersion of all the spatial harmonics. A qualitative sketch of the dispersion of a corrugated thin film waveguide is shown in FIG. 5. Also shown are points B and A which correspond, respectively, to the $m=0$ and $m=1$ harmonics of a mode whose energy flow is in the -z direction.

A synchronism between the electron beam 25 with velocity $v_e$ in the (+)z direction and the $m=1$ spatial harmonic is shown at point A. This obtains when $$v_e = \frac{\omega_o}{\frac{2\pi}{L} - |\beta_o|} \quad (3)$$

The $m=1$ component has oppositely directed phase and group velocity and this, as shown below, can lead to mirrorless tunable optical oscillation.

The coupled mode formalism is a convenient theoretical tool for treating electron-optical beam interactions. The interaction is assumed to take place between the slow space-charge wave of the beam and the $m=1$ spatial harmonic. The latter is represented by a complex amplitude $$a_1 = E_1/(2K_1)^{1/2} \beta_1 \quad (4)$$

where $E_1$ is the electric field of the $m=1$ harmonic at the beam position and the interaction impedance $K_1$ is defined by $$K_1 = E_1 E_1^*/2\beta_1^2 P \quad (5)$$

where P is the total power carried by the electromagnetic wave. The slow space-charge mode has a complex amplitude $$a_2 = (\omega_p v_e m/2\omega_o |\rho_o| e A)^{1/2} I_1 \quad (6)$$

where $\omega_p$ is the (reduced) plasma frequency of the beam, $e$ and $m$ the charge and mass of the electron, A the cross sectional area of the beam, and $I_1$ the alternating current amplitude of the slow space-charge mode. With the above definitions and in the limit of weak coupling, the power in the electromagnetic wave is given by $a_1 a_1^*$ while the kinetic power associated with the beam modulation is negative and is given by $-a_2 a_2^*$. The coupled mode equations for this case are $$da_1/dz = -i\beta_1 a_1 + Sa_2$$
$$da_2/dz = -i\beta_2 a_2 - Sa_1 \quad (7)$$

The coupling constant S is given by $$S^2 = \beta_e^3 K_1 I_o/8\beta_P V_o \quad (8)$$

with $\beta_e = \omega/v_e$, $\beta_P = \omega_P/v_e$. $I_o$ and $V_o$ are, respectively, the beam d.c. current and acceleration potential. $\beta_2$ is the propagation constant of the uncoupled slow space-charge wave and is given by $\beta_2 = \beta_e + \beta_P$. We are particularly interested in the possibility of oscillation. Because of the opposite directions of the phase and group velocity of the $m=1$ harmonic, the proper boundary conditions are to specify the field excitation $a_1(l)$ at $z=l$ and the beam excitation at $z=0$. We consider the case of an initially unexcited beam and take $a_2(O) = 0$.

A solution of (7) subject to the above boundary conditions yields the following expression for the wave amplification in one transverse.

$$\frac{a_1(0)}{a_1(l)} = \frac{1}{-\frac{(\sigma-b)}{\sigma+b} e^{-i(\sigma+b)l} + e^{-i(\sigma-b)}} + \frac{1}{-\frac{(\sigma+b)}{\sigma-b} e^{-i(\sigma-b)l} + e^{-i(\sigma+b)l}} \quad (9)$$

where $\sigma = \beta_2 - \beta_1 12$ and $b = \sqrt{\sigma^2 + S^2}$. Of particular interest is the synchronous case $\sigma = 0$. The solution of (7) for this case is $$a_1(z) = a_1(l)\cos(Sz)/\cos(sl) \, e^{-i\beta_1 z} \quad (10)$$

so that the gain for a section $l$ is $$a_1(O)/a_1(l) = 1/\cos(Sl)$$

When $Sl = \pi/2, 3\pi/2, \ldots$, the gain becomes infinite so that a finite output is available at $z=0$ with zero input, i.e., oscillation.

An examination of (9) shows that the oscillation condition can be satisfied only when the mismatch $\delta$ is zero. The oscillation frequency will thus correspond very nearly to the synchronism point A of FIG. 5 so that it can be tuned by varying the electron velocity. The device can also operate as a forward wave amplifier corresponding to synchronism with a forward (i.e., phase and group velocity in the same direction) spatial harmonic as shown by the intersection point D of FIG. 5. In this case we reverse the sign of S in the second of equations (7) and the solution for $\delta = 0$ is $$a_1(z)/a_1(O) = (e^{-Sz}/2 + e^{Sz}/2) \, e^{-i\beta_1 z} \quad (12)$$

An estimate of the gain (or coupling) constant S requires a knowledge of the interaction impedance $K_1$ which is the key parameter for this problem. From its definition in equation (5) we can write $K_1$ as $$K_1 = |E_1/E_o|^2 \cdot |E_o|^2/2\beta_o^2 P \cdot \beta_o^2/\beta_1^2 \quad (13)$$

from which it follows that to calculate $K_1$ we need to solve for the field harmonics $E_m(x)$. A first order perturbation solution of a TM wave propagating in a waveguide such as that shown in FIG. 4 yields $$K_1 \approx \lambda_o^4/\pi^2 c_o n_1^5 \xi_o w d^3 \, (a/L)^2 \quad (14)$$

for the case of a highly confined fundamental mode. $w$ is the dimension of the thin film in the $y$ direction.

As an example, we consider the case of an oscillator operating at $\lambda_o = 10\mu$ using GaAs thin film guide ($n_1 \approx 3.5$). Taking $v_e = c/10$ we obtain from (3) a corrugation period of $L \approx 0.75\mu$. We further assume $a = 1\mu$, $d = 2\mu$. The result is $$K_1 \approx 20 \text{ ohms}$$

Assuming a total current $I_o = 0.16 \times 10^{-7}$ amps, (1 amp/cm² over an aperture of $0.16\mu \times 10\mu$), $V_o = 3 \times 10^3$ volt, we obtain from (8)

$S = 66$ cm$^{-1}$ This implies that for the case of no optical losses the oscillation condition $Sl = \pi/2$ can be satisfied with $l = 240$ microns.

The main practical problem in the way of implementing such oscillators is that of maintaining the close proximity between the beam and the waveguide. The electromagnetic analysis shows that the field of the space harmonic varies as $\exp(-\gamma x)$ where $\gamma_1 = \sqrt{\beta_1^2 - k^2} \approx 2\pi/L$ for $\beta_1 \gg k$. In the case of a slowing down factor of x10 as used above we find using (3) that the e-folding distance is $\gamma^{-1}$ $\lambda_0/20\pi$. This suggests that the main potential range of oscillation of this device might be at the longer infrared wavelengths.

From the foregoing it is thus seen that for oscillation to take place in addition to satisfy the condition expressed by $$v_e = \frac{\omega_0}{\frac{2\pi}{L} - |\beta_0|}$$

$\cos(Sl)$ should be substantially zero, where S in the coupling constant as herebefore defined and $l$ is the waveguide length.

Although particular embodiments of the invention have been described and illustrated herein, it is recognized that modifications and variations may readily occur to those skilled in the art and consequently, it is intended that the claims be interpreted to cover such modifications and equivalents.

What is claimed is:

1. A travelling wave optical amplifier comprising:
    a dielectric optical waveguide supportive of an optical beam of a wavelength $\lambda$ in the optical region, said waveguide having first and second opposite ends and a top surface extending between said ends, said top surface being characterized by periodic corrugations with a periodicity L, between said ends;
    an evacuated envelope containing therein at least said corrugated top surface of said waveguide;
    means in said envelope for providing a focused electron beam in said envelope with an electron velocity definable as $v_e$, said electron beam being in close proximity to said corrugated top surface and extending in a direction parallel thereto; and
    input means for directing an optical beam of wavelength $\lambda$ to said waveguide which enters said waveguide through said first end, whereby said optical beam is amplified in said waveguide and the amplified optical beam exits said second end when $\lambda$ is not less and substantially equal to $c/v_e L$, where $c$ is the speed of light.

2. The travelling wave optical amplifier as described in claim 1, wherein said electron velocity $v_e$ is adjustable by the means in said envelope which provide said focused electron beam, up to a value on the order of 1/10c.

3. The travelling wave optical amplifier as described in claim 2 wherein L is in the micron range.

4. The travelling wave optical amplifier as described in claim 1 wherein said electron beam is spaced apart from said corrugated top surface a distance which is less than $\lambda$ and whereat the amplitude of the spatial first harmonic generated in said waveguide by the corrugated surface is substantially a maximum.

5. The travelling wave optical amplifier as described in claim 1 wherein said amplifier further includes a thin transparent electron-draining layer on top of said corrugated top surface for draining any electrons from said electron beam striking said layer.

6. The travelling wave optical amplifier as described in claim 5 wherein L is in the micron range and wherein said electron beam is spaced apart from said corrugated top surface a distance which is less than $\lambda$ and whereat the amplitude of the spatial first harmonic generated in said waveguide by the corrugated surface is substantially a maximum.

* * * * *

UNITED STATES PATENT OFFICE
CERTIFICATE OF CORRECTION

Patent No. 3,860,880  Dated Jan. 14, 1975

Inventor(s) Amnon Yariv, et al

It is certified that error appears in the above-identified patent and that said Letters Patent are hereby corrected as shown below:

Column 1
  line 51, "10v" should be --10μ--

Column 3
  line 10, "$\tilde{v}_e > \omega_o/2\pi/L + |\beta_o|$" should be --$\tilde{v}_e > \omega_o/(2\pi/L + |\beta_o|)$-- line 20, "$v_e \approx \omega_o/2\pi L = c/\lambda L$" should be --$v_e \approx (\omega_o/2\pi)L = (c/\lambda)L$-- line 27, "$1/10c \cdot \lambda/cL \approx 1$" should be --$(1/10)c \cdot \lambda/cL \approx 1$-- line 40, "$v_e \cdot \lambda/cL \approx 1$" should be --$v_e(\lambda/cL) \approx 1$--

Column 4
  line 55, (Equation 1), "$E_z(x,z,t) = \sum_{m=-\infty}^{\infty} E_m(x) e^{i(\omega_o t \; \beta_m z)}$"

should be --$E_z(x,z,t) = \sum_{m=-\infty}^{\infty} E_m(x) e^{i(\omega_o t - \beta_m z)}$-- line 60, (Equation 2), "$\beta_m \equiv |\beta_o| + m2\pi/L, \; m = \pm 1, \pm 2, \ldots$"

should be --$\beta_m \equiv \beta_o + m(2\pi/L), \; m = \pm 1, \pm 2, \ldots$-- line 64, "$0 < \beta_o(\Omega) < \pi/L$" should be --$0 < \beta_o(\omega) < \pi/L$--

UNITED STATES PATENT OFFICE
CERTIFICATE OF CORRECTION

Patent No. 3,860,880　　　　　　　　　　Dated Jan. 14, 1975

Inventor(s) Amnon Yariv, et al

It is certified that error appears in the above-identified patent and that said Letters Patent are hereby corrected as shown below:

continued

Column 5
  line 52 (Equation 8), "$S^2 = \beta_e^3 K_\ell I_o/8\beta_p V_o$" should be
--$S^2 = \beta_e^3 K_1 I_o/8\beta_p V_o$-- line 12, "$\sigma = \beta_2 - \beta_1 12$" should be --$\sigma = \beta_2 - \beta_1/2$--

Column 6
  line 15 (Equation 10), "$a_1(z) = a_1(\ell)\cos(sz)/\cos(s\ell)e^{-i\beta_1 z}$-- should be --$a_1(z) = [(a_1(\ell)\cos(Sz))/(\cos(S\ell))] e^{-i\beta_1 z}$-- line 37 (Equation 12), "$a_1(z)/a_1(0) = (e^{-Sz}/2 + e^{Sz}/2)e^{-i\beta_1 z}$"
should be --$a_1(z)/a_1(0) = (e^{-Sz}/2 + e^{Sz}/2)e^{-i\beta_1 z}$-- line 50 (Equation 14), "$K_1 \approx \lambda_o^4/\pi^2 c_o n_1^5 \xi_o wd^3 (a/L)^2$" should
be --$K_1 \approx (\lambda_o^4/\pi^2 c_o n_1^5 \varepsilon_o wd^3)((a/L)^2)$--

Column 7
  line 3, "with $\ell$ = 240 micron" should be against left hand margin.
  line 11, "$\gamma^{-1}\ \lambda_o/20\pi$" should be --$\gamma^{-1} \sim (\lambda_o/20\pi)$--

Signed and sealed this 6th day of May 1975.

(SEAL)
Attest:

RUTH C. MASON
Attesting Officer

C. MARSHALL DANN
Commissioner of Patents
and Trademarks